United States Patent
Wu et al.

(10) Patent No.: US 11,578,979 B2
(45) Date of Patent: Feb. 14, 2023

(54) FULLY AUTOMATIC SURVEY TECHNOLOGY (FAST)

(71) Applicant: Raytheon Company, Waltham, MA (US)

(72) Inventors: Shuwu Wu, Yorba Linda, CA (US); Fang Sheng, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 362 days.

(21) Appl. No.: 16/994,209

(22) Filed: Aug. 14, 2020

(65) Prior Publication Data
US 2021/0396523 A1    Dec. 23, 2021

Related U.S. Application Data

(60) Provisional application No. 63/042,251, filed on Jun. 22, 2020.

(51) Int. Cl.
*G01C 21/16* (2006.01)
*G01S 19/41* (2010.01)
*G01S 19/23* (2010.01)

(52) U.S. Cl.
CPC ............ *G01C 21/165* (2013.01); *G01S 19/23* (2013.01); *G01S 19/41* (2013.01)

(58) Field of Classification Search
CPC ....... G01C 21/165; G01S 19/23; G01S 19/41; G01S 19/074; G01S 19/15; G01S 19/32; G01S 19/44

See application file for complete search history.

(56) References Cited

U.S. PATENT DOCUMENTS

| 2011/0140958 A1* | 6/2011 | Henkel | G01S 19/04 342/357.27 |
| 2018/0252819 A1* | 9/2018 | Gao | G01S 19/32 |

OTHER PUBLICATIONS

International Civil Aviation Organization, "Guide for Ground Based Augmentation System Implementation", Sections 3.3.6 and 3.5.2. Retrieved online: <https://www.icao.int/SAM/eDocuments/GBASGuide.pdf>, (May 2013), 31 pgs.
Wu, Benjamin H., et al., "Differential GPS-Based Ultra-High Accuracy Real Time Attitude Determination", IEEE/ION GNSS, (Sep. 2011), 1877-1887.
Wu, Shuwu, et al., "Geometry Extra-Redundant Almost Fixed Solutions: A High Integrity Approach for Carrier Phase Ambiguity Resolution for High Accuracy Relative Navigation", IEEE/ION Plans, (May 2008), 568-582.

* cited by examiner

*Primary Examiner* — Tyler J Lee
*Assistant Examiner* — Yufeng Zhang
(74) *Attorney, Agent, or Firm* — Schwegman Lundberg & Woessner, P.A.

(57) ABSTRACT

FAST provides a method of "bootstrapping" a pseudo-range (PR) stage and one or more carrier-phase (CP) stages to quickly produce a highly accurate, high integrity receiver-to-receiver lever arm survey based on differential GNSS processing. The lever arm estimates of a previous stage are used to resolve the carrier phase ambiguities of the next stage. The method can be integrated with the warm-up of the integrity monitors to reduce the entire survey and warm-up startup time to 90 minutes or less, which is critical for mobile and make shift and precision approach and (automated) landing operations.

20 Claims, 10 Drawing Sheets

FULLY AUTOMATIC SURVEY TECHNOLOGY (FAST)

CROSS-REFERENCE TO RELATED APPLICATIONS

This application claims benefit of priority under 35 U.S.C. 119(e) to U.S. Provisional Application No. 63/042,251 entitled "Fully Automatic Survey Technology (FAST)" and filed on Jun. 22, 2020, the entire contents of which are incorporated by reference.

BACKGROUND OF THE INVENTION

Field of the Invention

This invention relates to a survey technology that is highly accurate and of high integrity and supports a fast startup of a Ground-Based Augmentation System (GBAS) for safety-of-life operations such as Precision Approach (PA) and Automatic Landing (AL) operations.

Description of the Related Art

The use of a Global Navigation Satellite System (GNSS) such as the Global Positioning System (GPS) for safety-critical, high-availability air navigation missions can be challenging due to the stringent integrity requirements for both military and civil aviation, and high accuracy requirements for unmanned landing operations. Relying solely on existing GNSS signals for high integrity Precision Approach (PA) and Automatic Landing (AL) operations is generally deemed inadequate in meeting stringent integrity requirements. This gives rise to development of various augmentation systems such Satellite-Based Augmentation System (SBAS) and Ground-Based Augmentation System (GBAS).

The prominent examples of GBAS are: US FAA's Local Area Augmentation System (LAAS), US Navy's sea-based Joint Precision Approach and Landing System (JPALS), and extending the sea-based JPALS into land-based applications such as fixed site and expeditionary systems (Land-Based JPALS). The target level of performance for GBAS is to support operational capabilities ranging from CAT-I (10 m VAL, PA to 200 ft Decision Height at ½ Nautical Miles) to CAT-III or equivalent (~4 m VAL, Automatic Landing, manned or unmanned).

In a safety-of-life high integrity navigation system, integrity monitoring against all possible failure modes that can cause navigation guidance to be hazardous and misleading must be performed. A GBAS ground system contains a set of differential GNSS processing algorithms, an accurate survey of relative positions, called "lever arms", between reference GNSS receivers and a suite of integrity monitors to mitigate threats to navigation solution integrity. Startup of a GBAS system for PA and AL operations requires both performance of the accurate, high integrity survey and the warm-up of the differential GNSS processing and integrity monitors. The integrity monitors typically require accurate receiver-to-receiver and receiver-to-touchdown point lever arms, hence the survey and warm-up are done serially.

In these types of survey applications, a "low integrity" system may provide a reliability of, for example, 99% whereas a "high integrity" system provides a reliability of greater than 99.99% and typically at or greater than 99.9999%. Integrity represents the very low rate of hazardous misleading information per airplane PA and AL. In precision and automated landing operations where safety-of-life and the potential for greater property damage is on the line, the failure rate is often required to be better than 1 in ten million per approach. The difference between a "low" and a "high" integrity requirement is significant both in navigation operations and in difficulties in achieving such systemic requirements. The survey itself may be conducted in a number of different ways.

One approach is to process the pseudo-range ranging measurements from a plurality of GNSS receivers positioned about the survey area. A basic pseudo-range ranging measurement at a single GNSS receiver measures a time difference between when a pseudo-random code was transmitted from a satellite and received at the GNSS receiver. A standard differential GNSS calculation generates lever arm estimates between each GNSS receiver pair. The process is repeated and the estimates time-averaged to reduce the error until a specified accuracy is achieved. For a low integrity system, this approach can provide accuracies of about 5 cm after eight hours. For a high integrity automatic landing system, the same accuracy requires additional days of data collection and analysis to validate the survey results.

Another approach is process the carrier-phase ranging measurements from a plurality of GNSS receivers positioned about the survey area. In a GNSS the carrier frequency is typically in the low GHz range and the code-frequency that is modulated onto the carrier is in the low MHz range. In theory, processing of the carrier can provide survey accuracies that are about 30 times better than those based on pseudo-range measurements. In practice, all else being equal CP estimates tend to be about 30× better than PR estimates. However, the inherent carrier phase ambiguity (the integer number of carrier cycles) must be resolved in order to compute the lever arm estimates. To do so, the pseudo-range ranging measurements are first smoothed for a few hours. A standard GNSS calculation forms a single system of equations to simultaneously resolve (using the smoothed PR ranging measurements) the carrier phase ambiguities and generate the lever arm estimates. Solving this large system of equations with many unknowns is complicated and takes time. The process is repeated and the estimates time-averaged to reduce the error until a specified accuracy is achieved. For a low integrity system, this approach can provide accuracies of better than 1 cm within several hours. For a high integrity system, the same accuracy requires additional days of data collection and analysis to validate survey results.

A different approach is to conduct an optical survey, which determines receiver pairwise lever arms and may also include lever arm to a touchdown point. The surveyed lever arms and runway heading are entered into the GBAS as Operational System Parameters. System test runs are carried out to ensure that the survey results are indeed accurate for a high integrity system and that the GBAS produces the expected level of service performance. This process is manual in nature, typically takes days to complete, and usually requires domain expertise in GBAS.

To gain high integrity assurance of survey results, each of the PR, CP and optical surveys must input survey results into GBAS, run and collect data for days, and perform post-data collection analysis. However, many PA and AL operations require quick system installation at make shift locations with potentially un-surveyed runways. Furthermore, the GBAS may have a stringent system startup time requirement to support PA and landing operations from the time GNSS turns on (e.g., within one or two hours of laying equipment down in field).

The current approaches of Pseudo-Range, Carrier Phase or optical surveys performed serially with the warm-up of the integrity monitors cannot meet the combination of the accuracy, high integrity and fast system startup requirements for certain operational environments.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of "bootstrapping" a pseudo-range (PR) stage and one or more carrier-phase (CP) stages to quickly produce a highly accurate, high integrity receiver-to-receiver lever arm survey based on differential GNSS processing. The lever arm estimates of a previous stage are used to resolve the carrier phase ambiguities of the next stage. The method can be integrated with the warm-up of the integrity monitors to further reduce the entire survey and warm-up startup time which can be critical for mobile and make shift precision approach and (automated) landing operations.

The method uses a differential GNSS calculation to process the pseudo-range ranging measurements to generate lever arm estimates for each receiver pair in stage 1. In stage 2, these estimates are used to resolve carrier phase ambiguities at a first carrier-based frequency f1 (e.g., one of multiple physical carrier frequencies or a linear combination thereof). The differential GNSS calculation then processes ambiguity-resolved carrier phase ranging measurements to generate lever arm estimates with an improved accuracy. Bootstrapping of the $1^{st}$ and $2^{nd}$ stages of PR and CP processing and breaking up the CP problem into separate ambiguity resolution and lever arm estimation problems greatly reduces the run time required to achieve accuracy and high integrity.

In different embodiments, the method may repeat stage 2 as stage 3 and 4 with higher and higher carrier-based frequencies (shorter and shorter wavelengths) to further reduce the lever arm estimation error. Moving from one stage to the next is conditioned upon the estimation error reaching a threshold value required to resolve ambiguities in the next stage with high integrity. In an embodiment, the threshold value is equal to or less than half the wavelength of the ambiguities at the carrier-based frequency of the next stage.

In an embodiment, stage 2 is a synthesized wide-lane frequency (L1−L2), stage 3 is L1 or L2 and stage 4 is a synthesized narrow lane frequency (L1+L2). Typically, time averaging is performed within each stage to reduce the estimation error until it satisfies the condition to move to the next stage. Of import, the synthesized wide-lane frequency in stage 2 is a difference frequency, which is lower than (longer wavelength) than any of the available physical carrier frequencies. As such, the "bootstrapping" starts at a relatively low accuracy (compared to say L1). In so doing, the method is able to transition from the PR stage 1 to the CP stage 2 quickly, and thus start realizing the benefits of using carrier-phase ranging measurements to generate the lever arms very early in the overall process.

In an embodiment, in stage 2 and later stages the central processing unit sets up a system of equations to resolve pairwise ambiguities for all GNSS receivers and performs high integrity carrier phase ambiguity resolution to ensure high integrity in the subsequent lever arm estimation. The system of equations may formulate a Real Time Attitude Determination (RTAD) problem to resolve the carrier phase ambiguities. The processing unit may use the Geometry Extra-Redundant Almost Fixed Solution (GERAFS) to ensure high integrity carrier phase ambiguity resolution. In this method, the system of equations for resolving the carrier phase ambiguities is distinct from using those ambiguity-resolved carrier phase ranging measurements to generate the lever arm estimates.

In an embodiment, the automated survey is integrated with the warm-up of a plurality of integrity monitors to further reduce the startup time of the GBAS, to ensure GBAS provides the high integrity measurement error bounds for the GERAFS processing and to lead to high integrity lever arm estimates. Because the survey period is reduced so dramatically by the "boostrapping" process, further integration of IM warm-up as a parallel process saves, for example, an additional 30 minutes. In conjunction with the inherent high integrity nature of lever arm estimation process, integration eliminates the required days long survey validation procedure GBAS data collection and analysis.

Differential GNSS processing and integrity monitors can be grouped into three subsets: insensitive to, moderately sensitively to, and highly sensitive to lever arm accuracy. Upon set-up and prior to starting stage 1 processing, the method immediately starts insensitive processing such as divergence-free smoothing of pseudo-range ranging measurements, estimation of absolution position of GBAS system via Receiver Autonomous Integrity Monitor (RAIM) and insensitive integrity monitors such as ephemeris monitor, jamming monitor, etc. Upon entering stage 2, the method starts moderately sensitive integrity monitors such as Cross Thread Edit Monitor, Receiver Clock Bias Monitor, Ionosphere Monitor, Code-Carrier Divergence Monitor, etc. Upon entering stage 3, the method starts any remaining highly sensitive integrity monitors such as Carrier Phase Monitor, Sigma Monitor, etc. In certain embodiments, the integrity monitors can provide data such as high integrity measurement error bounds to the central processing unit to use in the high integrity resolution of carrier phase ambiguities or lever arm estimation. For example, high integrity ranging measurement error bounds from the Carrier Phase and Sigma Monitors are processed during carrier phase ambiguity resolution to ensure high integrity in every instantaneous lever arm estimate from stage 3 onward.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a method of "bootstrapping" a pseudo-range (PR) stage and one or more carrier-phase (CP) stages to quickly produce a highly accurate, high integrity receiver-to-receiver lever arm survey based on differential GNSS processing. The lever arm estimates of a previous stage are used to resolve the carrier phase ambiguities of the next stage. The method can be integrated with the GBAS system warm-up to reduce the entire survey and system startup time, which is critical for mobile and make shift precision approach and (automated) landing operations. All told FAST can provide a lever arm survey with better than 1 cm accuracy, high integrity exceeding 99.99% and typically greater than 99.99999% and be operational within 90 minutes or less.

FAST is motived by two factors: (1) The need for fast system startup in expeditionary/tactical GBAS applications; and (2) high integrity differential GPS (or GNSS) process can achieve the most stringent level of accuracy required by GBAS systems that support navigation services up to the most challenging Unmanned Aerial Vehicle (UAV) automatic landing operations. FAST is also applicable to provide highly accurate surveys quickly that only require low integrity.

Figure 1:
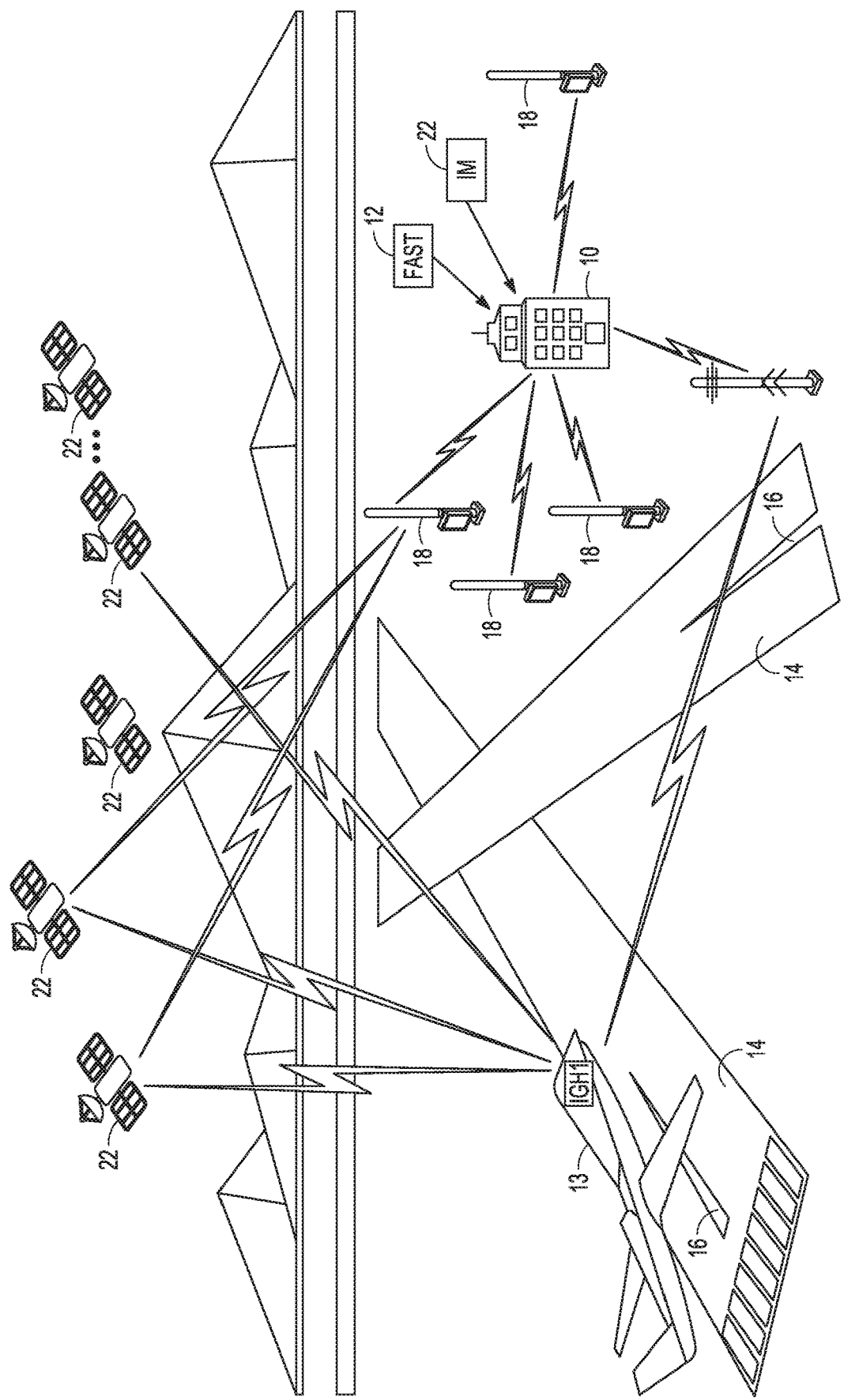
FIG. 1 is a diagram of a GBAS configured to implement a Fully Automated Survey Technology (FAST) for an existing airport.
Figure 2:
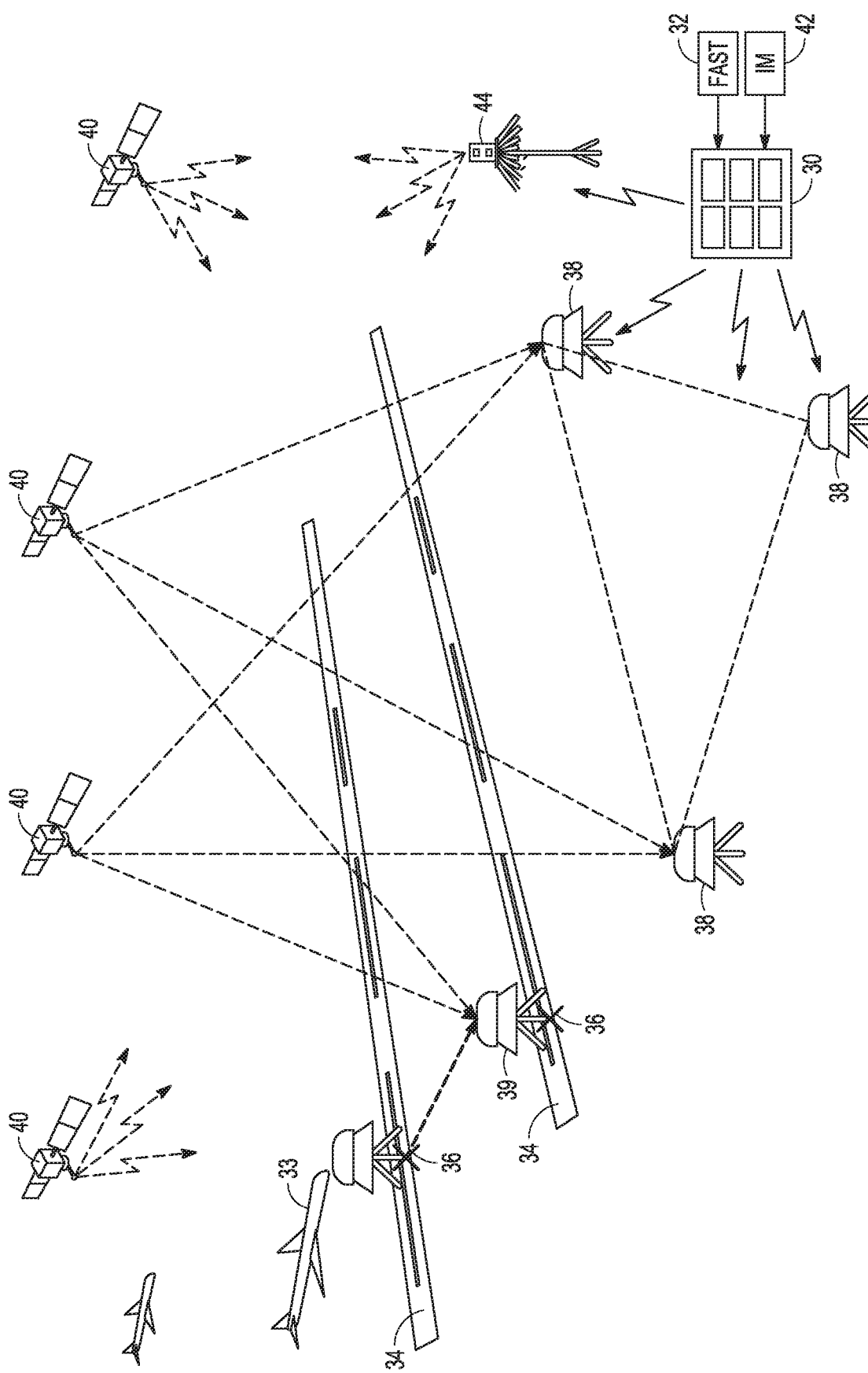
FIG. 2 is a diagram of a GBAS configured to implement FAST for a GBAS with touchdown point survey.

As shown in FIGS. 1 and 2, FAST can be deployed to provide highly accurate (<1 cm error) lever arm surveys that supports high integrity (>99.99%) of airfields as part of a GBAS for various landing operations. GBAS processes the lever arm survey results to (1) allow ground system GPS processing and integrity monitoring and (2) support generating signal-in-space data that define runways and hover points for aircraft's precision approach and landing. This data is transmitted from GBAS to the approaching aircraft.

Referring now to FIG. 1, a Ground-Based Augmentation System (GBAS) 10 including one or more central processing units may implement FAST 12 for Precision Approach (PA) and Automatic Landing (AL) operations of aircraft 13 on an existing airfield 14 in which a survey to a touchdown point(s) 16 already exists. The survey to touchdown point requires less accuracy than the receiver-to-receiver lever arm survey and could, for example, be done offline with an optical survey. The system includes a plurality of Global Navigation Satellite System (GNSS) receivers 18 positioned in a local area to be surveyed and GBAS 10. Each GNSS receiver 18 receives carrier phase ranging measurements at two or more carrier frequencies (e.g., L1 and L2) and pseudo-range ranging measurements from four or more GNSS satellites 20 and transmits the measurements to the GBAS central processing unit. GBAS 10 also implements a plurality of Integrity Monitors (IMs) 22. The IMs may be implemented within the central processing unit or may be external monitoring devices that transmit data to the GBAS.

Referring now to FIG. 2, a Ground-Based Augmentation System (GBAS) 30 may implement FAST 32 for Precision Approach (PA) and Automatic Landing (AL) operations of aircraft 33 on a mobile or make shift airfield 34 in which a survey to a touchdown point(s) 36 is unknown. The system includes a plurality of Global Navigation Satellite System (GNSS) receivers 38 positioned in a local area to be surveyed and an additional GNSS receiver 39 temporarily positioned at touchdown point(s) 36 and GBAS 30. Receiver 39 is removed after completion of the lever arm survey. Each GNSS receiver 38 receives carrier phase ranging measurements at two or more carrier frequencies (e.g., L1 and L2) and pseudo-range ranging measurements from four or more GNSS satellites 40 and transmits the measurements to the GBAS central processing unit. GBAS 30 also implements a plurality of Integrity Monitors (IMs) 42. The IMs may be implemented within the central processing unit or may be external monitoring devices that transmit data to the GBAS. A data broadcast station or radios 44 broadcast Precision Approach and Automatic Landing data messages such as GPS augmentation or reference measurement data, station location data and runway or hover point data.

For both configurations, FAST implements a bootstrapping technique that estimates the unknown lever arms with increasing survey accuracy to meet the final survey accuracy requirement. The accuracy achieved in a prior stage allows enough lever arm accuracy to fix carrier phase integer ambiguities correctly in the next stage, and thus use ambiguity-resolved carrier phase ranging measurements to generate the lever arm estimates, which is inherently more accurate than using pseudo-range ranging measurements to generate the estimates. Lever arm estimates using carrier phase ranging measurements are typically 30× better than estimates using pseudo range ranging measurements all else being equal. Furthermore, within Stages 2, 3 and perhaps 4, high integrity calculation such as by leveraging a GERAFS technique enhances chances for ambiguity resolution and provides high integrity assurance, leading to eventual high integrity assured survey results. The method can be integrated with the warm-up of the integrity monitors to reduce the entire survey and warm-up startup time to be within 90 minutes, which is critical for mobile and make shift precision approach and (automated) landing operations. The end result is that FAST can meet the demanding fast system startup requirements and high accuracy and high integrity required in safety-of-life operations such as military and civilian aviation.

D-GNSS processing and integrity monitors can be grouped into three subsets: not sensitive to, moderately sensitively to, and highly sensitive to receiver-to-receiver lever arm accuracy. Once the survey has reached the requisite estimation error to satisfy the sensitivity requirements of a certain subset, those integrity monitors may ingest the relative lever arm estimates and initiate warm-up. This reduces the total startup time, and may in certain situations provide information from the monitors as they warm-up to augment the automated survey.

A partial list of Integrity Monitors (IMs) includes:
(1) Not Sensitive
  Divergence-Free Smoothing: Smoothing of raw pseudo-ranges at a carrier frequency or a combination of carrier frequencies by using carrier phases at a specific combination of carrier frequencies so that during the smoothing ionosphere delays are cancelled (hence the term divergence-free). Such a pair of pseudo-range and carrier phase is called a conjugate pair. Using the conjugate carrier phase measurements to smooth pseudo-ranges at a given carrier or synthesized frequency guarantees ionosphere delay (hence temporal variation of ionosphere delay) to be cancelled, leading to averaging down of receiver measurement errors without taking on ionosphere induced error;
  Receiver Autonomous Integrity Monitor (RAIM): Estimates absolution position of GBAS system location on Earth by performing RAIM, which is a very commonly used absolute positioning technique employed by military and civil aviation during en-route phase of a flight;
  Ephemeris Monitor: Monitors GNSS satellites for excessive orbit errors from both broadcasted and unannounced satellite maneuvers to ensure orbit errors (hence calculated satellite orbit position errors) to be properly bounded or otherwise some satellites should be excluded from being using for high integrity navigation solution; and
  Jamming Monitor: Monitors for any presence of radio frequency interference or jamming;
(2) Moderately Sensitive
  Cross Thread Edit Monitor: Performs cross receiver measurement comparison to screen out large measurement error outliers;
  Receiver Clock Bias Monitor: Monitors for excessive receiver clock bias and drift rate;
  Ionosphere Monitor: Monitors for presence of severe ionosphere effects and provide proper ionosphere effect estimates and associated estimation uncertainties to be used in computation of a high integrity navigation solution; and
  Code-Carrier Divergence Monitor: Monitors for potential code-carrier divergence for GNSS ranging signals;
(3) Highly Sensitive
  Carrier Phase and Sigma Monitor: Monitor for excessive pseudo-range and carrier phase errors and determines high integrity error uncertainty bounds to be used in computation of a high integrity navigation solution.

Figure 3A:
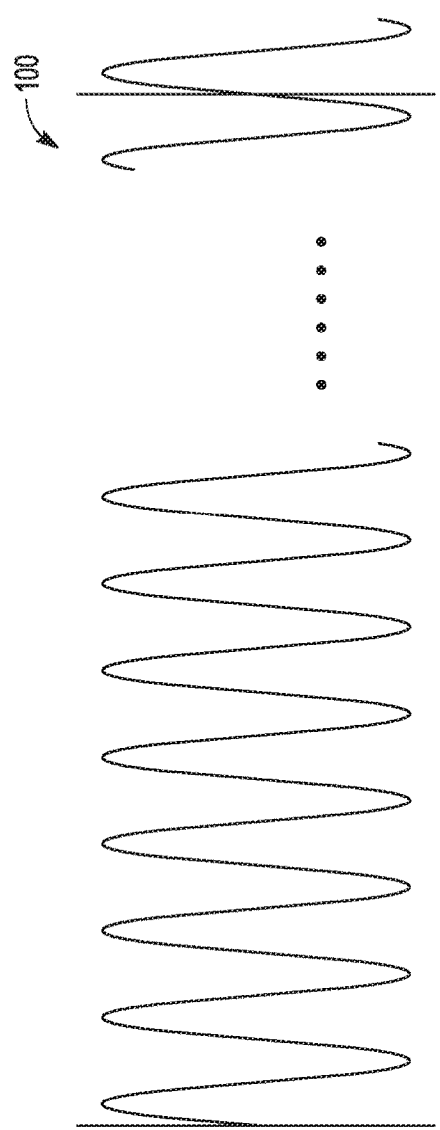
FIGS. 3a and 3b are diagram illustrating carrier phase ambiguity
Figure 3B:
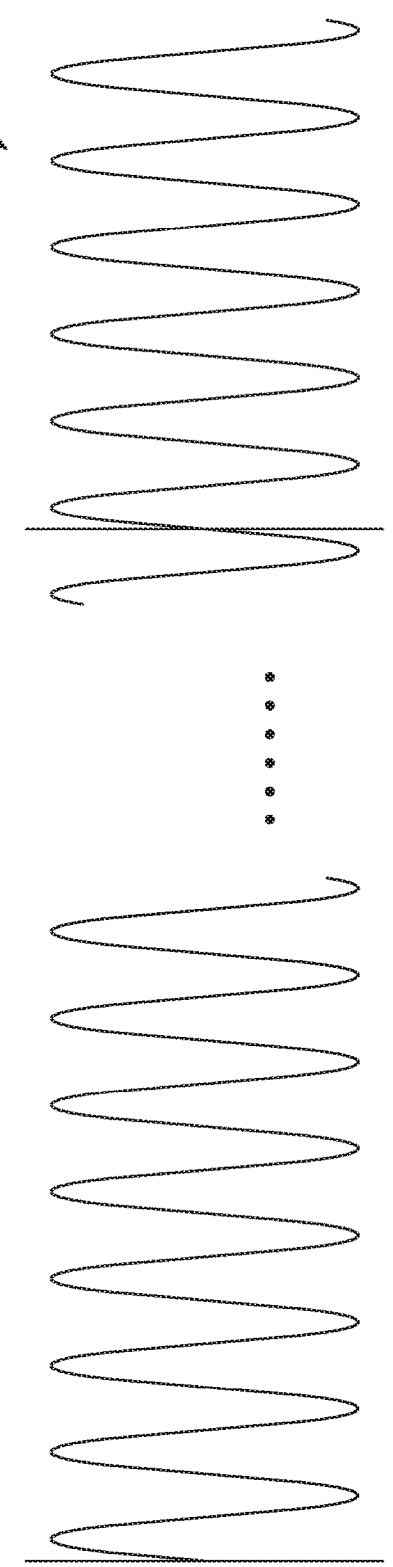
Figure 4:
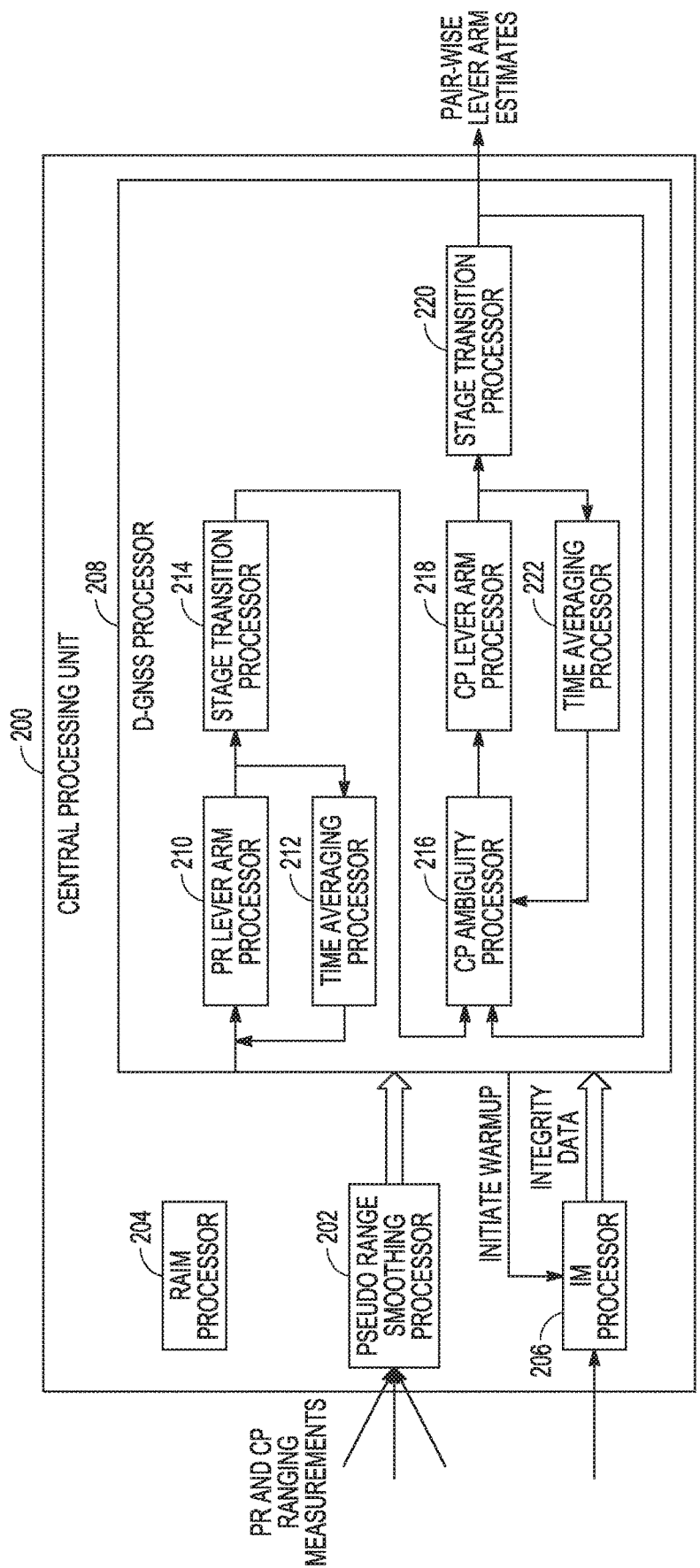
FIG. 4 is a block diagram of an embodiment of FAST to perform an automated lever arm survey of GNSS receivers based on differential GNSS processing that is integrated with the warm-up of the integrity monitors to provide the requisite survey accuracy and high integrity in a reduced startup window
Figure 5A:
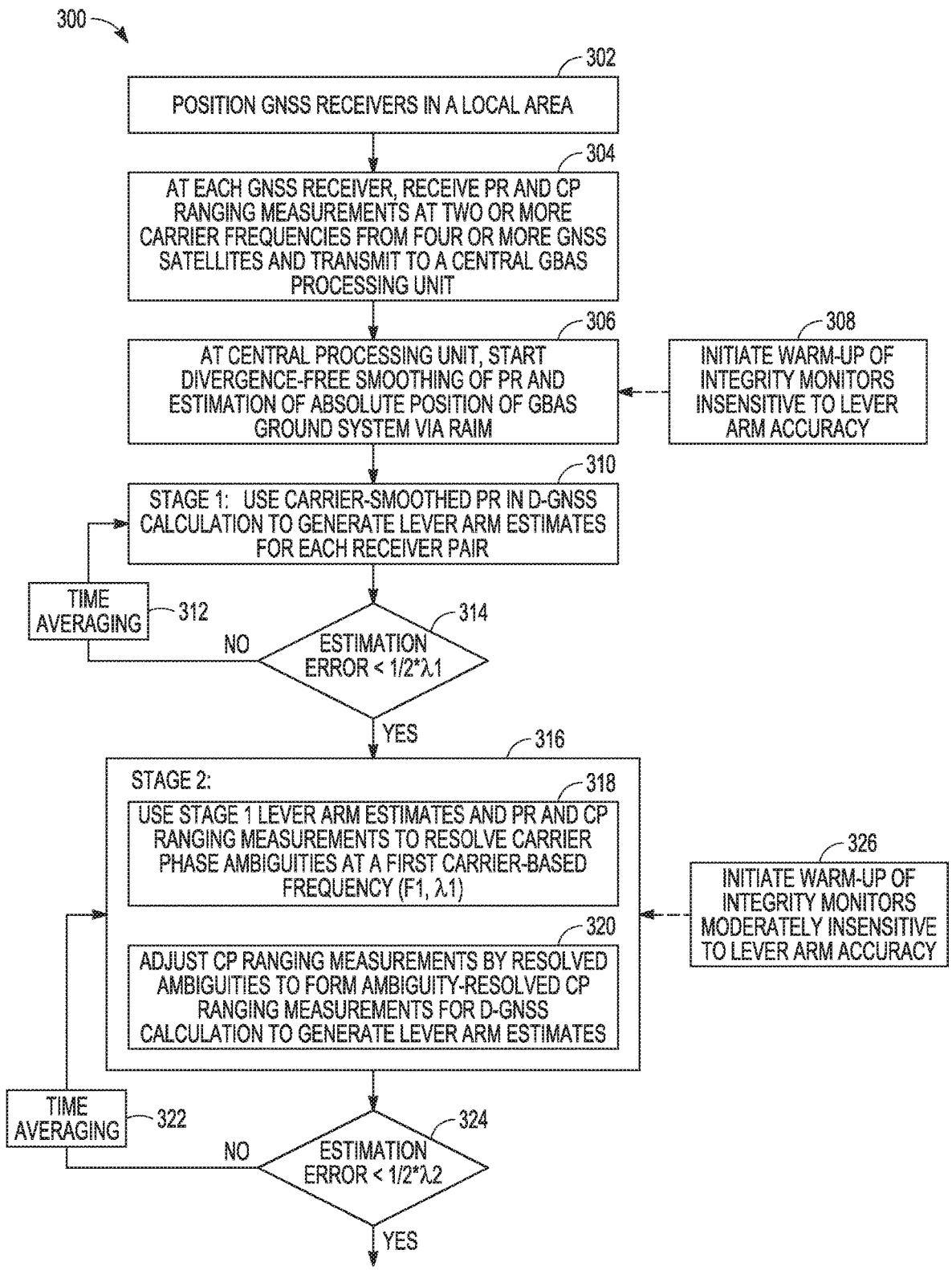
FIGS. 5a and 5b are a flow diagram of an embodiment of FAST in which multiple PR and CP stages are "bootstrapped" and different subsets of IMs warmed up at different stages to quickly provide a high accuracy, high integrity lever arm survey.
Figure 5B:
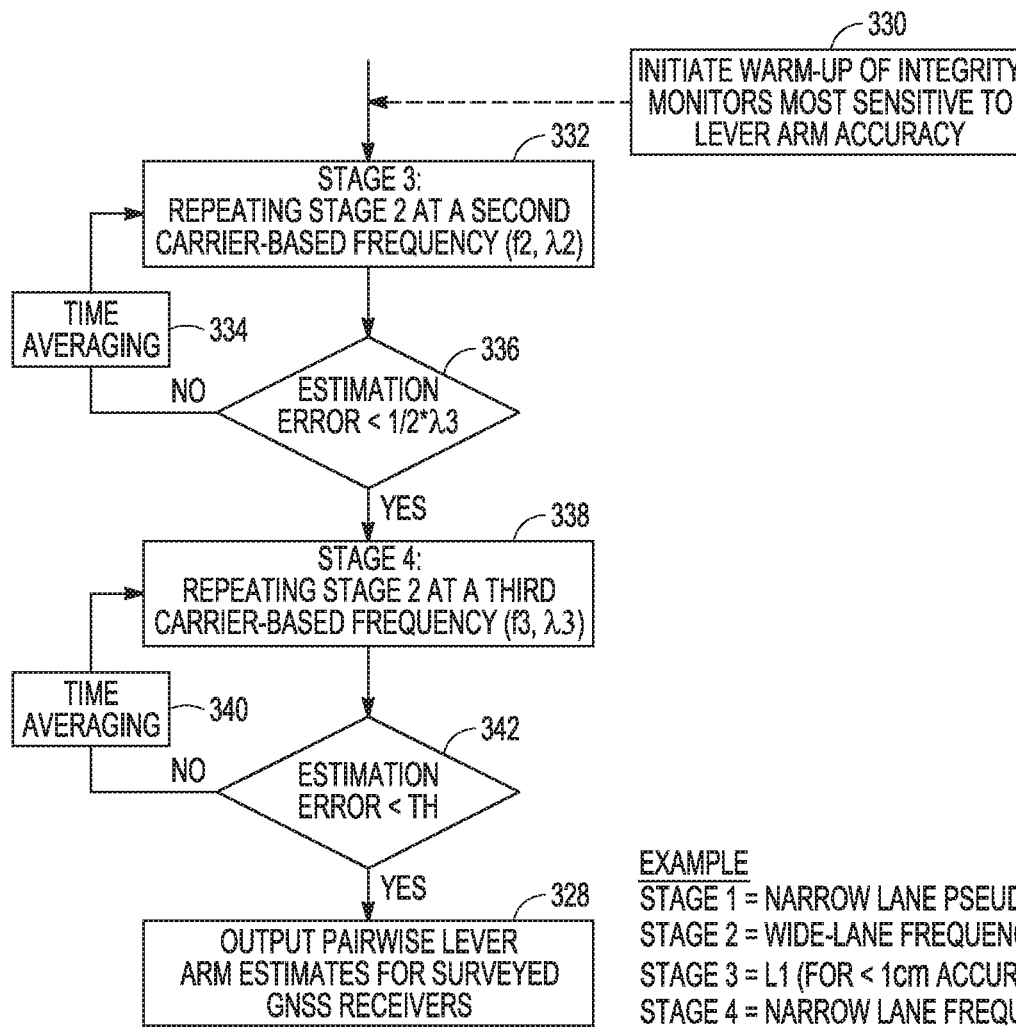
Figure 6:
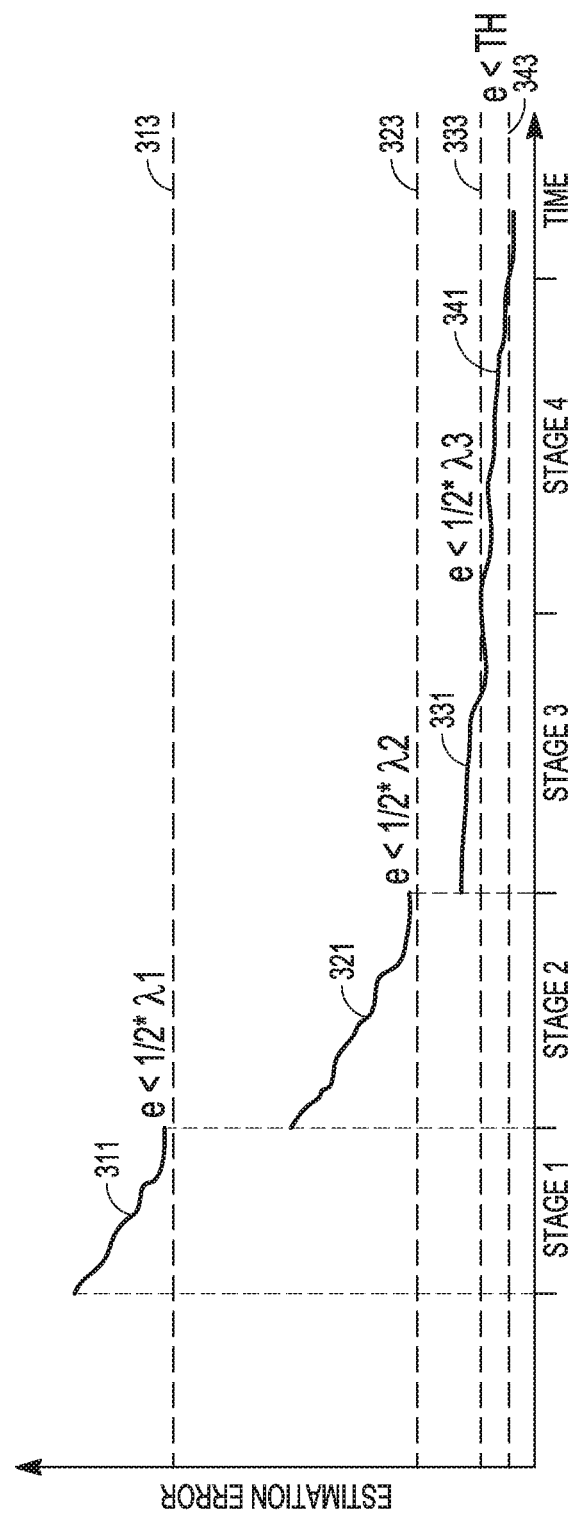
FIG. 6 is a plot of lever arm estimation error and stage transition for multiple bootstrapped stages.

Referring now to FIGS. 3a and 3b, a GPS receiver provides the carrier phase ranging measurement via acquiring phase lock with the satellite signal. It measures the initial fractional phase (cycle) difference 100 between the received and receiver-generated signals as shown in FIG. 3a, and from then on tracks changes in this measurement, counting full cycles and keeping track of the fractional cycle 102 at each measurement epoch as shown in FIG. 3b. The distance between the Satellite and the receiver is an integer number of full carrier phase cycles plus the fractional cycle. The integer number of full carrier phase cycle information is off by an integer cycle, which is referred to as "carrier phase ambiguity" in the technical field. In an idealized case of error-free measurements with perfect and synchronized satellite and receiver clocks, and no relative motion between the satellite and the user, the Carrier Phase (in cycle) is computed as $\phi(t)=\Phi_r(t)-\Phi^s(t-\tau)+N$, where $\Phi_r(t)$ is the phase of the receiver-generated signal phase, $\Phi^s(t-\tau)$ is the phase of the signal at the satellite at time $(t-\tau)$ phase, and N is the Integer Ambiguity of the carrier phase.

As previously described, a single system of equations with a large number of unknowns is used to simultaneously resolve the carrier phase ambiguity and generate the lever arm estimates. Simultaneously solving for ambiguities and lever arms with high integrity may not be practical given the additional number of unknowns associated with lever arms (each lever arm is a 3D vector or consists of three unknowns). Critically, FAST splits the problem into two sequentially parts. First, FAST resolves the carrier phase ambiguities using up-to-the moment best lever arm estimates and subsequently forms ambiguity-resolved carrier phase ranging measurements. Second, FAST uses those measurements to generate the carrier phase-based receiver-to-receiver lever arm estimates. Each problem has fewer unknowns and thus can be solved with higher integrity or more quickly. A key to this approach is that the previous stage, whether stage 1 PR or a previous CP stage, must produce lever arm estimates with sufficient accuracy to resolve the carrier phase ambiguities in the current stage.

In the GERAFS algorithm, it is a complex series of mathematical calculations to resolve carrier phase integer ambiguities. Conceptually, the procedure can be thought of using smoothed pseudo-ranges in conjunction with carrier phase measurements in a mathematical setup to solve for some lever arm vectors or rotational angles (roll, pitch and yaw) concurrently with fixing the integer ambiguities. One of the first steps is to estimate float values (as oppose to true integer values) of ambiguities. One of the subsequent steps involves rounding of the float ambiguity estimates to 'fix' them to integer values. Therefore, conceptually speaking (although real math is much more complicated), if smoothed pseudo-range error plus contributing error from the previously estimated lever arms (stage N) is less than ½ of wavelength for the corresponding ambiguities (Stage N+1), then the probability of rounding to result in a correct integer fix is high. Therefore in the FAST algorithm, ½ wavelength of the next stage is a figure of merit for measuring the tolerable level of errors in the previously estimated lever arm vectors.

Another related and important feature of the "bootstrapping" measure to reduce startup time is to avoid jumping directly from the pseudo-range estimates of stage 1 to the carrier frequency e.g., L1 or L2 or Narrow Lane (NL) that provides the terminal estimates and accuracy. Rather stage 2 is preferably executed at difference frequency of the carrier frequencies, which is lower than (longer wavelength) than any of the available physical carrier frequencies. As such, the "bootstrapping" starts at a relatively low accuracy (compared to say L1). In so doing, the method is able to transition from the PR stage 1 to the CP stage 2 quickly, and thus start realizing the benefits of using carrier-phase ranging measurements to generate the lever arms very early in the overall process.

Referring now to FIGS. 4, 5a-5b and 6, in an embodiment, a CPU 200 including one or more processors implements at least two and possibly four (or more) stages of FAST 300 to quickly generate a survey of relative lever arms that is both accurate and of high integrity, and which is integrated with the simultaneous warm-up of a set of integrity monitors to provide a system startup time (including survey) of less than 90 minutes. Prior to initiating FAST, a plurality of GNSS receivers are positioned in a local area in communication with a central GBAS processing unit and four or more GNSS satellites as shown in FIGS. 1 and 2 (step 302). FAST requires at least three GNSS receivers placed in at least three locations forming a non-degenerate triangle or polygon. Each GNSS receiver receives pseudo-range and carrier phase ranging measurements at two or more carrier frequencies e.g., L1 and L2, from four or more GNSS satellites and transmits the measurements to the central GBAS processing unit (step 304).

A pseudo-range smoothing processor 202 immediately starts divergence-free smoothing of the pseudo-range ranging measurements and a RAIM processor 204 initiates estimation of the absolute position of the GBAS ground system (the processing unit) via RAIM (step 306). GBAS initiates warm-up of the integrity monitors such as the Ephemeris and Jamming monitors (step 308) suitably implemented in an IM processor 206 that are insensitive to lever arm accuracy, and thus can be started before any lever arm estimates are available. In certain situations, data generated by the integrity monitors during warm-up can be fed back to FAST to augment the survey and ensure integrity.

Starting in stage 1, a D-GNSS process 208 including a PR lever arm processor 210 uses the carrier-smoothed pseudo-range ranging measurements to generate lever arm estimates for each receiver pair (step 310). The process is repeated with new measurements and the lever arm estimates time averaged (step 312) by a time averaging processor 212 until a transition processor 214 determines that the estimation error e1 311 for each GNSS receiver pair is less than a threshold 313 (step 314). The threshold must be such that the accuracy achieved in stage 1 allows enough lever arm accuracy to fix carrier phase integer ambiguities correctly in stage 2 and so forth. To ensure this condition the threshold is set at (or significantly less than) one-half the wavelength used in stage 2 e.g., TH=½*λ1.

Once the accuracy condition is satisfied, starting in stage 2, step 1 (step 316), a CP ambiguity processor 216 uses the lever arm estimates from stage 1 and pseudo-range and carrier phase ranging measurements at the two or more carrier frequencies to resolve carrier phase ambiguities at a first carrier-based frequency (f1, λ1) (step 318) and adjusts the carrier phase ranging measurements by the resolved carrier phase ambiguities to form ambiguity-resolved carrier phase ranging measurements. The first carrier-based frequency f1 is suitably formed as a difference of two of the physical carrier frequencies e.g., f1=L1−L2. As such, f1 is lower frequency (longer wavelength) than any of the physical carrier frequencies. This allows the process to transition from stage 1 to stage 2 more quickly.

In stage 2, step 2, a CP lever arm processor 218 uses the ambiguity-resolved carrier phase ranging measurements to generate lever arm estimates for each receiver pair (step 320). The process is repeated with new measurements and the lever arm estimates time averaged (step 322) by a time averaging processor 220 until a stage transition processor 222 determines that the estimation error e1 321 for each GNSS receiver pair is less than a threshold 323 (step 324). As with the previous stage, the threshold is set at (or significantly less than) one-half the wavelength used in the next stage 3 e.g., TH=½*λ2. By separating the resolution of carrier phase ambiguities and the calculation of the lever arm estimates into two distinct problems e.g., two different systems of equations, the method proceeds more quickly. It is easier, and faster, to solve two systems of equations sequentially with high integrity than it is to solve one large system of equations simultaneously with high integrity. But doing so requires the existence of lever arm estimates of suitable accuracy from the previous stage, as is provided by the bootstrapping process.

Upon entering stage 2, GBAS initiates warm-up of the integrity monitors such as the Cross Thread Edit Monitor, Receiver Clock Bias Monitor, Ionosphere Monitor and Code-Carrier Divergence Monitor (step 326) that are moderately to lever arm accuracy. In certain situations, data generated by the integrity monitors during warm-up can be fed back to FAST to augment the survey during stage 2 to ensure integrity in the resolution of carrier phase ambiguities and in the generation of lever arm estimates.

Depending upon the accuracy requirements of the survey, at the completion of stage 2 FAST (stage transition processor 220) can terminate the survey and output the pairwise lever arms for the surveyed GNSS receivers (step 328). GBAS initiates warm-up of the integrity monitors such as Carrier Phase and Sigma (step 330) that are the most sensitive to lever arm accuracy.

To reduce the estimation error and increase the accuracy of the lever arm estimates, the processing unit can repeat stage 2 with progressively higher carrier-based frequencies (shorted wavelengths), either actual physical carrier frequencies such as L1 and L2 or a synthesized frequency such as L1+L2. The computation of the lever arm estimates with shorter wavelengths, and particularly using ambiguity-resolved carrier phase ranging measurements progressively reduces the estimation error. The trick or constraint is that the next carrier-based frequency must be selected such that the previous stage estimation error can be reduced via time average to satisfy the threshold constraint. As such, to achieve highly accurate surveys e.g. estimation errors<1 cm, FAST cannot make a single large jump from the stage 1 processing of pseudo-range measurements to a high carrier frequency in stage 2 processing carrier phase measurements. The threshold condition would not be satisfied and the carrier phase ambiguities could not be resolved with high integrity. Instead, FAST must "bootstrap" the processes through multiple stages to resolve the carrier phase ambiguities at each stage and reduce the estimation error. In theory, FAST can repeat stage 2 as stages 3, 4 and so forth as long as the processing unit has access to a higher carrier frequency from the satellites or can synthesize a higher frequency via linear combinations of the physical carrier frequencies.

Assuming additional accuracy is desired, in stage 3 the processing unit repeats the steps of stage 2 at a second synthesized carrier frequency (f2, λ2) (step 332) to resolve the carrier phase ambiguities and use the ambiguity-resolved carrier phase ranging measurements to generate lever arm estimates and time average those estimates (step 334) until the estimation error 331 satisfies the condition 333 (e.g., estimation error<½*λ3) to move to the next stage (step 336) at the next synthesized carrier frequency (f3, λ3). In stage 4, the processing unit repeats the steps of stage 2 at a third synthesized carrier frequency (f3, λ3) (step 338) to resolve the carrier phase ambiguities and use the ambiguity-resolved carrier phase ranging measurements to generate lever arm estimates and time average those estimates (step 340) until the estimation error 341 satisfies the final termination condition 343 (step 342).

In an embodiment, the GNSS satellites provide pseudo range and carrier phase measurements at carrier frequencies L1=1.57542 GHz (λ1=19.029 cm) and L2=1.22760 GHz (λ2=24.421 cm). Stage 1 uses a narrow-lane pseudo-range differential GPS (DGPS) solution to provide lever arm estimates with approximately 25 cm 1-sigma accuracy for each epoch. The estimates are time averaged for 3-5 minutes to improve the accuracy. Stage 2 uses a wide-lane (L2−L1) carrier phase ambiguity resolved DGPS solution to provide lever arm estimates with about 6 cm 1-sigma accuracy at every epoch, time averaged over another 3-5 minutes to improve the accuracy. The better than 25 cm accuracy from stage 1 is less than one-half the wavelength (approximately 86 cm) of a synthesized carrier frequency L2−L1. Stage 3 uses L1 carrier phase ambiguity resolved DGPS solution to provide lever arm estimates with about 1 cm 1-sigma accuracy at every epoch, time averaged for 30-40 minutes to improve the accuracy to less than 1 cm. The better than 6 cm accuracy from stage 2 is less than one-half the wavelength (approximately 19.029 cm) of a physical carrier frequency L1. Stage 4 uses narrow lane (L1+L2) carrier phase ambiguity resolved DGPS solution to provide lever arm estimates with about 5 mm 1-sigma accuracy at every epoch, time averaged for 30 minutes to improve the accuracy to less than 5 mm. The better than 1 cm accuracy from stage 3 is less than one-half the wavelength of a synthesized carrier frequency L1+L2 (approximately 10.695 cm). In this manner, FAST is able to bootstrap from the initial PR estimates of 25 cm to estimates better than 5 mm in under an hour while providing high integrity.

The mathematical formulations for Stage 1 follows the standard DGPS calculation for relative lever arm vector as described in Pratap Misra, Per Enge, "Global Positioning System (Signals, Measurements, and Performance)" Revised Second Edition, 2011, which is hereby incorporated by reference. In an embodiment configured to provide high integrity, the mathematical formulation for Stages 2, 3 and possibly 4 follows the GERAFS and RTAD calculations described in S. Wu, S. R. Peck, R. M. Fries, G. A. McGraw, "Geometry Extra-Redundant Almost Fixed Solutions: A High Integrity Approach for Carrier Phase Ambiguity Resolution for High Accuracy Relative Navigation," IEEE/ION PLANS, May 2008 and B. H. Wu, S. R. Peck, S. Wu, "Differential GPS-Based Ultra-High Accuracy Real Time Attitude Determination," IEEE/ION GNSS, September 2011, respectively, which are hereby incorporated by reference.

The algorithms briefly explained above utilize modern high integrity relative positioning techniques. A relative positioning concept is the use of Carrier Phase (CP) measurements for relative positioning. The mathematical background for high integrity CP relative positioning is described below. In one example, there is a reference (R) and an airborne, rover or other (A) GPS receiver, each simultaneously tracking the same n GPS satellites. A GPS observable, $O_i$ is defined for the $i^{th}$ GPS satellite, i=1, . . . , n, which can be a raw or smoothed L1/L2 pseudorange (PR), an L1/L2 carrier phase, or any linear combinations thereof, such as a wide lane (WL) carrier phase or a narrow lane (NL) PR.

Figure 7:
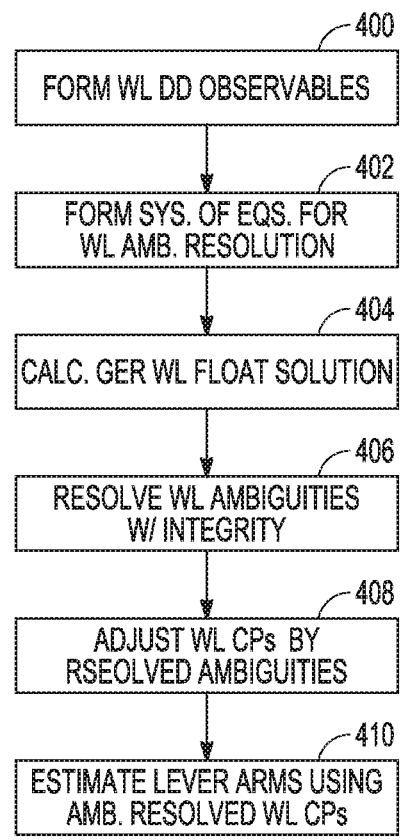
FIG. 7 is a flow diagram of an embodiment of a carrier phase stage of the flow diagram.

Referring now to FIG. 7, in an embodiment of stage 2, steps 1 and 2 where the first carrier-based frequency is the wide-lane frequency L1−L2, the single differenced (SD) observables between the airborne/rover/other and reference are defined as: $SD_{Oi}=O_i^A - O_i^R$. To form double differenced (DD) observables, i=1 can be chosen as the reference satellite (e.g., a highest elevation satellite). The double differenced observables are formed from single difference observables. The WL double difference observables are defined as: $DD_{Oi}=SD_{Oi}-SD_{O1}$, and there are n−1 such observables (step 400). The main advantage of using the double differenced observables is that both the receiver and satellite clock biases along with other common-mode signal-in-space errors drop out from the observation equations. High integrity integer ambiguity resolution is another element of a lever arm vector calculation. The calculations start with the previously computed double difference observations.

There are multiple types of double difference observations that can be used. The types of double difference observations include, but are not limited to, Wide-Lane (WL), L1, L2, Narrow-Lane (NL), etc. In one configuration, the DD L1 CP and the DD NL PR can be used as the observations. This combination of measurements is commonly used in high integrity relative positioning; typically the NL PR measurements are smoothed with the L1 CP measurements using divergence-free smoothing techniques. The L1 and NL notation is used in the following examples, but can be generalized for any wavelength or wavelength combination. For a short lever arm (e.g., less than 300 m) where residual atmospheric errors can be neglected, via linearization with an initial lever arm value (usually equals the most recently averaged lever arm estimate), a linearized set of positioning equations in step 402 is given by:

$$\underbrace{\begin{pmatrix} \varphi_{L1} \\ \rho_{NL} \end{pmatrix}}_{y} = \underbrace{\begin{pmatrix} G & A \\ G & 0 \end{pmatrix}}_{H} \underbrace{\begin{pmatrix} \delta x \\ N_{L1} \end{pmatrix}}_{X} + \varepsilon,$$

wherein $\varphi_{L1}$ is the vector of DD L1 CP measurements, $\rho_{NL}$ is the vector of DD NL PR measurements, G is the differenced line of sight (LOS) geometry matrix, $\delta x$ is the correction to the lever arm vector (used for linearization) between the airborne/rover/other and the reference receiver, $N_{L1}$ is the vector of L1 ambiguities, $A=\lambda_{L1}I$, with $\lambda_{L1}$ the L1 wavelength, I the identity matrix, and $\varepsilon$ is the DD measurement error. In the equation above, the system can comprise of 2(n−1) DD measurements (L1 CP and NL PR) and n+2 unknowns. Therefore, a solution exists whenever n≥4, with the geometric redundancy of n−4. In one example, the covariance is defined as:

$$\text{cov}(\varepsilon) = \sum = \begin{pmatrix} \sum_{L1} & \sum_{L1N} \\ \sum_{L1N}^T & \sum_{NL} \end{pmatrix}.$$

Consider an over-determined linear system with unknown coefficients, $\widehat{\delta X}$, and an observed data set, y: $y=H\delta X+\varepsilon$. The linear least squares estimate for the unknown coefficients is given as: $\widehat{\delta X} = (H^T H)^{-1} H^T y$. The weighted least squares (WLS) method is preferred when a more robust calculation is desired. A weighting matrix can be used to give more and less weights to higher and lower confidence measurements from the data set, respectively. The weighting matrix used here is the inverse of the covariance matrix, $\Sigma^{-1}$.

In step 404, the Geometry Extra-Redundant (GER) initial float solution is calculated using a standard weighted least squares solution, which is given by:

$$\widehat{\delta X}, = (H^T H)^{-1} H^T$$

The covariance associated with the float estimates is given by:

$$P = \begin{pmatrix} Q_{\hat{x}} & Q_{\hat{x}\hat{N}} \\ Q_{\hat{N}\hat{x}} & Q_{\hat{N}} \end{pmatrix} = \left( H^T \sum{}^{-1} H \right)^{-1}$$

For Stage 1, an epoch-by-epoch lever arm estimate is obtained by adding this float solution of lever arm correction to the initial lever arm used for linearization. For Stage 2 & 3, the subsequent calculations are also carried out.

In some applications like our Stages 2 & 3 calculations, multiple reference GPS receivers can be employed to both improve continuity of service and provide cross-thread integrity monitoring. Reference receiver measurements can be translated to a single reference point so they can be compared for integrity monitoring purposes. Additional geometric redundancy can be introduced when incorporating two or more complete sets of reference GPS measurements, which are combined with the rover GPS measurements to solve for a single lever arm vector in one set of system of equations. We use two sets of reference GPS L1 measurements (corresponding to a GBAS system with three reference receivers for Stage 3 calculation) as an example (and the extension to more than four or more reference receivers is simply by adding more sets of reference GPS measurements), the double difference system equations become:

$$\begin{pmatrix} \varphi_{L1}^1 \\ \rho_{NL}^1 \\ \varphi_{L1}^2 \\ \rho_{NL}^2 \end{pmatrix} = \underbrace{\begin{pmatrix} G & A & 0 \\ G & 0 & 0 \\ G & 0 & A \\ G & 0 & 0 \end{pmatrix}}_{H} \underbrace{\begin{pmatrix} \delta x \\ N_{L1}^1 \\ N_{L1}^2 \end{pmatrix}}_{x} + \varepsilon,$$

wherein the superscripts 1 and 2 are the data set indices, and $\delta x$ is correction to initial roll, pitch and heading. Further improvements can be made by augmenting the system of equations with known roll, pitch or heading. The Stage 2 calculation differs from this example only by replacing the L1 DD carrier phases with WL DD carrier phase and carrying out the same exact subsequent calculations. In this example, the system can comprise 4n−4 equations and 2n+1 unknowns, which yields 2n−5 number of redundant equations. Comparing to the single reference receiver case described above that has a geometric redundancy given by n−4, the additional measurements can make up for the additional ambiguities. In one example, when n=8, the equation for when two sets of reference GPS measurements are used yields 11 redundant equations, which is 7 more than what is provided in the single reference case. This extra degree of measurement redundancy is termed "geometric extra-redundancy". The geometric extra-redundancy significantly improves both the Probability of a Correct Fix (PCF) and the Probability of Almost Fix (PAF), yielding improved availability, while maintaining high integrity, of almost fixed solutions.

One approach for CP ambiguity resolution in step 406 is based on the Least-squares AMBiguity Decorrelation Adjustment (LAMBDA) algorithm. The first step is to compute a float solution by ignoring the integer constraints of CP ambiguities and performing a standard weighted least squares adjustment. The least squares method involves fitting a linear equation to a data set.

The LAMBDA algorithm determines an integer transformation matrix, $Z \in \mathbb{Z}^{n-1}$ with det(Z)=1 that approximately diagonalizes $Q_{\hat{N}}$. The ambiguities and their associated variance-covariance are transformed as:

$$\hat{a} = Z^T \hat{N}_{L1} \text{ and } Q_{\hat{a}} = Z^T Q_{\hat{N}} Z.$$

The covariance matrix for the decorrelated ambiguities can be decomposed as:

$$Q_{\hat{a}} = LDL^T,$$

wherein L is lower triangular matrix with ones on the diagonal and $$D = \text{diag}\{\sigma_1^2, \sigma_{2|1}^2, \ldots, \sigma_{i|I}^2, \ldots, \sigma_{n-1|N-1}^2\}.$$

In this example, $\sigma_{i|I}^2$ is the variance of the $i^{th}$ least-squares ambiguity obtained through a conditioning on the previous I={1, ..., i−1} ambiguities. This transformation yields the bootstrapping ambiguity resolution technique, with the fixed integers given by:

$$\check{a}_1 = [\hat{a}_1]$$
$$\check{a}_2 = [\hat{a}_{2|1}] = [\hat{a}_2 - l_{21}(\hat{a}_1 - \check{a}_1)]$$
$$\vdots$$
$$\check{a}_i = [\hat{a}_{i|I}] = \left[\hat{a}_i - \sum_{j=1}^{i-1} l_{ij}(\hat{a}_{j|J} - \check{a}_j)\right], i = 1, \ldots, N-1,$$

wherein $1_{ij}$ is the i–j element of L and [*] is the integer rounding function.

The bootstrapping technique of resolving ambiguities is used to estimate the most likely set of integer ambiguities. The bootstrapping technique provides an analytical expression for computing probability of obtaining a particular (correct or incorrect) integer fix, which is in contrast to the integer least squares approach normally used with LAMBDA. The probability of bootstrapping method yielding a particular integer fix, z, is given by:

$$P(\check{a} = z) = \prod_{i=1}^{N-1} \left\{ \Phi\left(\frac{1 - 2l_i^T(\hat{a} - z)}{2\sigma_{i|I}}\right) + \Phi\left(\frac{1 + 2l_i^T(\hat{a} - z)}{2\sigma_{i|I}}\right) - 1 \right\},$$

$$z \in \mathbb{Z}^{n-1} \text{ with } \Phi(x) = \frac{1}{\sqrt{2\pi}} \int_{-\infty}^{x} \exp\left\{-\frac{1}{2}v^2\right\} dv,$$

$$\text{and } P(\check{a} = a) = \prod_{i=1}^{N-1} \left[2\Phi\left(\frac{1}{2\sigma_{i|I}}\right) - 1\right].$$

Here $I_i$ is the $i^{th}$ column vector of the unit lower triangular matrix $L^{-T}$ and a is the vector of true integer ambiguities. Therefore, the computation of the PAF is obtained by summing up the PCF and each of the probability of almost fixed solution.

The fixed CP ambiguities are determined in step 408 as $\check{N}_{L1} = Z^{-T}\check{a}$. The fixed CP ambiguities can be used to determine high accuracy lever arm vectors between GPS receivers or high accuracy attitude measurements.

The carrier phase measurements, the geometry matrix, and the resolved integer ambiguities from last step can all be used to compute a lever arm correction vector step 410. The lever arm correction vector can represent a high accuracy and integrity lever arm correction vector to the initial lever arm (from prior averaged estimate and used for linearization in setting up the DD system of equations). The lever arm correction vector can also be referred to as a refined lever arm vector. In one example, the lever arm correction vector ($\delta x$) is calculated using $\delta x = (G^T W G)^{-1} G^T W \varphi'$, wherein G is a line of sight geometry matrix, T is the matrix transpose operation, W is a weighting matrix, and $\varphi'$ is an updated carrier phase measurement. In one example, G can represent a double difference line of sight geometry matrix that is calculated using differential GPS techniques. In addition, $\varphi' = \varphi - \lambda N = G\delta x + \varepsilon$, wherein $\varphi = G\delta x + \lambda N + \varepsilon$, wherein $\varphi$ is an initial carrier phase measurement, λ is a wavelength, N is a carrier phase integer ambiguity, and ε is a measurement error. The carrier phase integer ambiguity (N) can be fixed for different wavelength combinations, such as an L1 wavelength, an L2 wavelength, a wide lane (WL) wavelength or a narrow lane (NL) wavelength. For Stages 2 through 4, an epoch-by-epoch, accurate lever arm estimate is obtained by adding this lever arm correction, δx (calculated by $\widehat{\delta X}_i = (G^T G)^{-1} G^T \varphi'$ or the WLS method), to the initial lever arm used for linearization. In other words, the initial lever arm vector can be refined by using the resolved ambiguities. The refined lever arm vector can provide a more accurate, instantaneous estimation of the distance between the two reference receivers in question.

Figure 8:
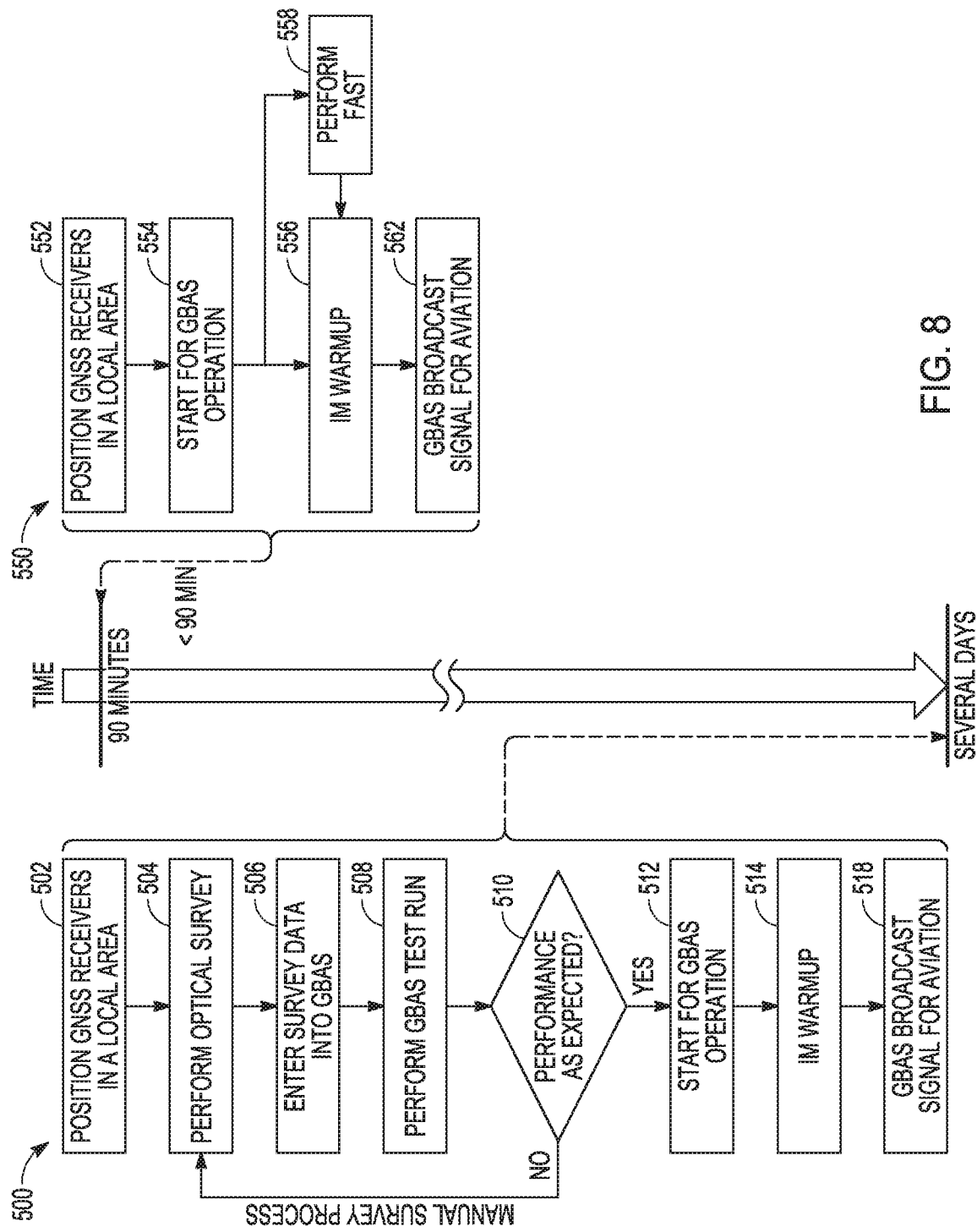
FIG. 8 is a flow diagrams comparing a conventional survey and serial warm-up of the IMs with FAST and integrated warm-up of the IMs for a high integrity survey.

FIGS. 8a and 8b offer a comparison of a conventional GBAS startup procedure 500 using an optical survey and a new GBAS start-up procedure 550 using FAST to provide 1 cm level accuracy with high integrity. A conventional startup procedure positions GNSS receivers in a local area (step 502), performs an optical survey (step 504), enters survey data into GBAS (step 506), perform a GBAS test run (step 508) and determine whether the survey performed as expected (step 510). If not, a manual survey process is conducted and steps 504 through 510 are repeated until expected performance is achieved. As previously described, the manual survey process is very slow. Thereafter start for GBAS operation (step 512), initiate IM warm-up (step 514) and go operational with GBAS broadcast signal for aviation (step 518). This process typically requires several day. This may be acceptable in some operational scenarios involving existing airfields but is unacceptable for mobile operations. If either the known PR or CP approaches are used instead of the optical survey, the manual survey process can be avoided. This may shorten the entire startup time from several days to several hours but integrity may be sacrificed. Regardless a several hour startup time is insufficient for many of the operational scenarios.

By comparison, the FAST startup procedure 550 positions GNSS receivers in a local area (step 552), initiates start for GBAS operation (step 554), performs FAST (step 556) and IM warm-up (step 558) in tandem and, once complete goes operational with GBAS broadcast signal for aviation (step 562). This process requires 90 minutes or less from startup of the GNSS receivers to operational status of GBAS. Note, the IM warm-up could be done after FAST and provide the same high integrity results. This may add 30 minutes to the system startup.

The Fully Automatic Survey Technology (FAST) enables a key technology discriminator for a GBAS offering against the existing navigation technologies such as Instrument Landing System (ILS) or GBAS without FAST. With FAST, GBAS can be set up on a makeshift airfield, turned on, and start Precision Approach and Landing operations within 90 minutes (and possibly in 60 minutes). That is an unheard off fast system startup time for the precision approach and landing operations. FAST offers added operational capabilities and flexibilities to our war fighters and disaster relief efforts.

Figure 9:
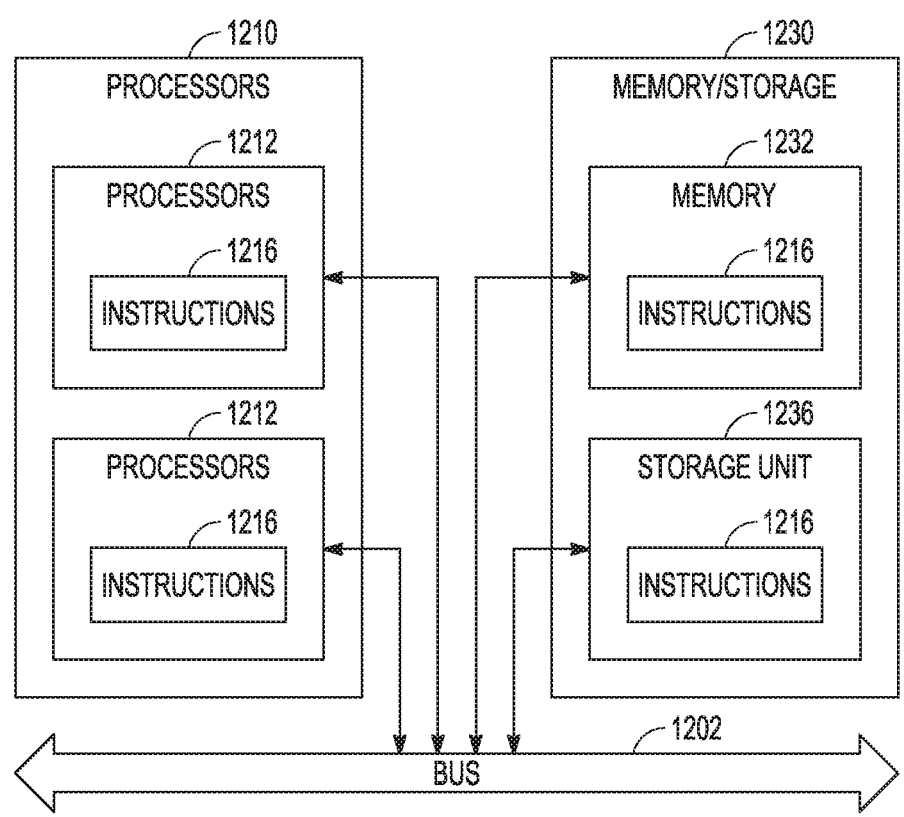
FIG. 9 is a block diagram of a machine able to read instructions from a machine-readable medium and perform any one or more of the methodologies discussed herein.

FAST provides the following advantages:
  Providing a key operational capability for an expeditionary/tactical GBAS and is not offered by any existing solutions; and
  A critical technological discriminator in the GBAS, UAV automatic landing, or GNSS-based high integrity navigation applications in general.
Applications of FAST include, but are not limited to:
  Landing an aircraft, such as a fixed-wing jet, helicopter or UAVs on a moving platform (i.e., an aircraft carrier, an amphibious assault ship, an oil drilling platform or a floating platform for recovery of launched space rockets)
  Fixed site or expeditionary/tactical GBAS
  Civil GBAS for emergency evacuation/disaster relief
Example Machine Architecture and Machine-Readable Medium FIG. 9 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1200 (e.g., software, a program, an application, an applet, an app, or other executable code) for causing the machine 1200 to perform any one or more of the methodologies discussed herein may be executed. For example the instructions may cause the machine to execute the FAST of FIGS. 1, 2 and 4 and flow diagrams of FIGS. 5a-5b, 7 and 8. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a personal digital assistant (PDA), or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210 and memory 1230, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Electrically Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of automatic lever arm survey, comprising:
   positioning a plurality of Global Navigation Satellite System (GNSS) receivers in a local area;
   at each GNSS receiver, receiving carrier phase ranging measurements at two or more carrier frequencies and pseudo-range ranging measurements from four or more GNSS satellites and transmitting the measurements to a central processing unit;
   at the central processing unit,
      starting in stage 1, using the pseudo-range ranging measurements in a differential GNSS calculation to generate receiver-to-receiver lever arm estimates with an estimation error e1 for each GNSS receiver pair;
      starting in stage 2,
         using the lever arm estimates from stage 1 and pseudo-range and carrier phase ranging measurements to resolve carrier phase ambiguities at a first carrier-based frequency f1; and then
         adjusting the carrier phase ranging measurements by the resolved carrier phase ambiguities to form ambiguity-resolved carrier phase ranging measurements and using the ambiguity-resolved carrier phase ranging measurements in the differential GNSS calculation to generate receiver-to-receiver lever arm estimates with an estimation error e2<e1 for each GNSS receiver pair; and
      outputting the pair-wise lever arm estimates as a survey for the GNSS receivers.

2. The method of claim 1, wherein said first carrier-based frequency comprises one of the at least two carrier frequencies or a linear combination of two or more carrier frequencies.

3. The method of claim 1, further comprising:
   switching from stage 1 to stage 2 when the estimation error e1 in stage 1 is less than half of the wavelength of the first carrier-based frequency of stage 2.

4. The method of claim 3, further comprising:
   in stage 1, time-averaging the receiver-to-receiver lever arm estimates until the estimation error e1 is less than half of the wavelength of the first carrier-based frequency.

5. The method of claim 1, wherein in stage 2 the step of resolving carrier phase ambiguities comprises:
   setting up a system of equations for resolving pairwise carrier phase ambiguities for all of the GNSS receivers; and
   using a Geometry Extra-Redundant Almost Fixed Solution (GERAFS) algorithm to solve the system of equations to resolve the carrier phase ambiguities with high integrity>99.99%.

6. The method of claim 1, further comprising:
   starting in stage 3,
      using the receiver-to-receiver lever arm estimates from stage 2 and pseudo-range and carrier phase ranging measurements to resolve carrier phase ambiguities at a second carrier-based frequency f2 where f2>f1; and then
      adjusting the carrier phase ranging measurements by the resolved carrier phase ambiguities to form ambiguity-resolved carrier phase ranging measurements and using the ambiguity-resolved carrier phase ranging measurements differential GNSS calculation to generate receiver-to-receiver lever arm estimates with an estimation error e3<e2 for each GNSS receiver pair.

7. The method of claim 6, further comprising
   time-averaging the lever arm estimates in stage 2 until estimation error e2 is less than half of the wavelength of the third carrier-based frequency f3; and
   time-averaging the lever arm estimates in stage 3 until estimation error e3 is less than a specified threshold.

8. The method of claim 7, wherein the two or more carrier frequencies include L1 and L2 where L1>L2,
   in stage 1, the lever arm estimates are generated using smoothed narrow-lane (NL) pseudo-ranges and time averaging the estimates until e1 is less than half the wavelength of the first carrier-based frequency f1;
   in stage 2, wide-lane (WL) carrier phase ambiguities are resolved with high integrity>99.99% and the lever arm estimates are generated using WL ambiguity-resolved carrier phase ranging measurements based on L1−L2 and time averaging the estimates until e2 is less than half the wavelength of the second carrier-based frequency f2; and
   in stage 3, L1 or L2 carrier phase ambiguities are resolved with high integrity>99.99% and the lever arm estimates are generated using L1 or L2 ambiguity-resolved carrier phase ranging measurements and time averaging the estimates until e3 is less than a specified threshold.

9. The method of claim 8, wherein the specified threshold is at most 1 cm.

10. The method of claim 8, further comprising executing a stage 4 to resolve carrier phase ambiguities and generate receiver-to-receiver lever arm estimates at a third carrier-based frequency f3>f2, wherein the specified threshold for stage 3 is one half the wavelength of the third carrier-based frequency f3, wherein in stage 4, narrow-lane (NL) carrier phase ambiguities are resolved with high integrity>99.99% and the receiver-to-receiver lever arm estimates are generated using NL ambiguity-resolved carrier phase ranging measurements based on L1+L2 and time averaging the estimates until e4 is less than a final threshold.

11. The method of claim 6, where first carrier-based frequency f1 is a difference of two carrier frequencies and said second carrier-based frequency f2 is one of the two carrier frequencies.

12. The method of claim 11, wherein stages 1 and 2 each run for at most ten minutes.

13. The method of claim 6, further comprising initiating warm-up of one or more integrity monitors prior to starting each of stages 1, 2 and 3.

14. The method of claim 13, further comprising processing integrity data from the one or more integrity monitors to the processing unit to ensure the integrity of the resolution of the carrier phase ambiguities and the integrity of the receiver-to-receiver lever arm estimates.

15. The method of claim 13, wherein the integrity monitors initiated prior to stage 1 are selected from Divergence-Free Smoothing, Ephemeris and Jamming monitors, prior to stage 2 are selected from Cross Thread Edit, Receiver Clock Bias, Ionosphere and Code-Carrier Divergence monitors; and prior to stage 3 are selected from Carrier Phase and Sigma monitors.

16. The method of claim 13, wherein the survey and warm-up of all the integrity monitors is completed in less than 90 minutes from the startup of the plurality of GNSS receivers.

17. The method of claim 1, further comprising:
temporarily positioning an additional GNSS receiver at a touchdown point during automatic lever arm survey;
including the ranging measurements from the additional GNSS receiver in the stage 1 and 2 processing to generate the pair-wise lever arm estimates for all GNSS receivers including the additional GNSS receiver as touchdown point lever arm survey parameters for operationally guiding aircraft to the touchdown location; and
removing this additional GNSS receiver from the touchdown point after completion of the automatic lever arm survey.

18. The method of claim 1, wherein the lever arm estimates from stage 1 are used a single time to resolve carrier phase ambiguities for a $1^{st}$ epoch and thereafter the lever arm estimates from stage 2 are used to resolve the carrier phase ambiguities.

19. An apparatus, comprising:
at least one processor configured to:
receive carrier phase ranging measurements at two or more carrier frequencies and pseudo-range ranging measurements from four or more Global Navigation Satellite System (GNSS) receivers in a local area;
starting in stage 1, use the pseudo-range ranging measurements in a differential GNSS calculation to generate receiver-to-receiver lever arm estimates with an estimation error e1 for each GNSS receiver pair;
starting in stage 2,
use the lever arm estimates from stage 1 and pseudo-range and carrier phase ranging measurements to resolve carrier phase ambiguities at a first carrier-based frequency f1; and then
adjust the carrier phase ranging measurements by the resolved carrier phase ambiguities to form ambiguity-resolved carrier phase ranging measurements and use the ambiguity-resolved carrier phase ranging measurements in the differential GNSS calculation to generate receiver-to-receiver lever arm estimates with an estimation error e2<e1 for each GNSS receiver pair; and
output the pair-wise lever arm estimates as a survey for the GNSS receivers.

20. A method of automatic lever arm survey, comprising:
positioning a plurality of Global Navigation Satellite System (GNSS) receivers in a local area;
at each GNSS receiver, initiating system startup to warm-up and receive carrier phase ranging measurements at two or more carrier frequencies and pseudo-range ranging measurements from four or more GNSS satellites and transmitting the measurements to a central processing unit;
at the central processing unit,
initiating warm-up of a first subset of integrity monitors;
starting in stage 1,
using the pseudo-range ranging measurements in a differential GNSS calculation to generate receiver-to-receiver lever arm estimates with an estimation error e1 for each GNSS receiver pair; and
time-averaging the lever arm estimates until the estimation error e1 is less than one half the wavelength of a first carrier-based frequency f1 equal to a difference of two carrier frequencies;
initiating warm-up of a second subset of integrity monitors;
starting in stage 2,
using the lever arm estimates from stage 1 and pseudo-range and carrier phase ranging measurements to resolve carrier phase ambiguities at the first carrier-based frequency f1 with high integrity>99.99%; and then
adjusting the carrier phase ranging measurements by the resolved carrier phase ambiguities to form ambiguity-resolved carrier phase ranging measurements and using the ambiguity-resolved carrier phase ranging measurements in the differential GNSS calculation to generate receiver-to-receiver lever arm estimates with an estimation error e2<e1 for each GNSS receiver pair; and
time-averaging the lever arm estimates until estimation error e2 is less than one half the wavelength of a second carrier-based frequency f2>f1 where f2 is one of the carrier based frequencies;
initiating warm-up of a third subset of integrity monitors;
starting in stage 3,
repeating the steps of stage 2 at the second carrier-based frequency f2 to generate receiver-to-receiver lever arm estimates with an estimation error e3<e2; and
time-averaging the lever arm estimates until estimation error e2 is less than a specified threshold;

within 90 minutes of system startup, outputting the pair-wise lever arm estimates as a survey for the GNSS receivers.

* * * * *

UNITED STATES PATENT AND TRADEMARK OFFICE
CERTIFICATE OF CORRECTION

| | |
|---|---|
| PATENT NO. | : 11,578,979 B2 |
| APPLICATION NO. | : 16/994209 |
| DATED | : February 14, 2023 |
| INVENTOR(S) | : Wu et al. |

It is certified that error appears in the above-identified patent and that said Letters Patent is hereby corrected as shown below:

In the Drawings

Sheet 10 of 10, Fig. 9, reference numeral 1212 (Second Occurrence), Line 1, delete "1212" and insert --1214-- therefor In the Specifications In Column 4, Line 20, delete ""boostrapping"" and insert --"bootstrapping"-- therefor In Column 9, Line 50, delete "220" and insert --222-- therefor In Column 9, Line 51, delete "222" and insert --220-- therefor In Column 12, Line 44, delete "$\widehat{\delta X}_j,$" and insert --$\widehat{\delta X}_j$,-- therefor In Column 12, Line 46, delete "$\widehat{\delta X}_j$," and insert --$\widehat{\delta X}$-- therefor In Column 12, Lines 55-57, delete "$\widehat{\delta X}_j$," and insert --$\widehat{\delta X}$-- therefor In Column 14, Line 21, delete "1 $_{ij}$" and insert --1$_{ij}$-- therefor In Column 15, Line 9, delete "$\widehat{\delta X}_j$," and insert --$\widehat{\delta X}$-- therefor In Column 16, Line 17, delete "1200" and insert --1216-- therefor Signed and Sealed this
Ninth Day of April, 2024

*Katherine Kelly Vidal*
Katherine Kelly Vidal
*Director of the United States Patent and Trademark Office*

CERTIFICATE OF CORRECTION (continued)
U.S. Pat. No. 11,578,979 B2

In the Claims

In Column 18, Line 44, in Claim 7, delete "comprising" and insert --comprising:-- therefor